US012683256B2

(12) United States Patent
Ren

(10) Patent No.: US 12,683,256 B2
(45) Date of Patent: Jul. 14, 2026

(54) INSULATION BRACKET AND BATTERY MODULE

(71) Applicant: EVE POWER CO., LTD., Jingmen (CN)

(72) Inventor: Chaoju Ren, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 870 days.

(21) Appl. No.: 18/003,337

(22) PCT Filed: Oct. 18, 2022

(86) PCT No.: PCT/CN2022/125953
§ 371 (c)(1),
(2) Date: Dec. 26, 2022

(87) PCT Pub. No.: WO2023/151306
PCT Pub. Date: Aug. 17, 2023

(65) Prior Publication Data
US 2024/0106096 A1 Mar. 28, 2024

(30) Foreign Application Priority Data

Feb. 11, 2022 (CN) .......................... 202220278057.8

(51) Int. Cl.
H01M 50/586 (2021.01)
H01M 50/213 (2021.01)
(Continued)

(52) U.S. Cl.
CPC ....... H01M 50/586 (2021.01); H01M 50/213 (2021.01); H01M 50/505 (2021.01);
(Continued)

(58) Field of Classification Search
None
See application file for complete search history.

(56) References Cited

U.S. PATENT DOCUMENTS

2012/0058384 A1 3/2012 Ogura
2015/0072211 A1 3/2015 Nakamura
(Continued)

FOREIGN PATENT DOCUMENTS

CN 209401797 U 9/2019
CN 211766093 U 10/2020
(Continued)

OTHER PUBLICATIONS

European Office Action issued in corresponding European Patent Application No. 22821845.9 dated Sep. 23, 2025, pp. 1-6.
(Continued)

*Primary Examiner* — Ula C Ruddock
*Assistant Examiner* — Mary Grace Harris
(74) *Attorney, Agent, or Firm* — PV IP PC; Wei Te Chung; Christopher S. Ruprecht

(57) ABSTRACT

An insulation bracket and a battery module are provided. The insulation bracket is disposed on a battery cell group including a plurality of battery cells. A first electrode and a second electrode of each of battery cells are disposed on a same side of battery cell. The insulation bracket includes a plurality of insulation plates connected to each other. Each of insulation plates is disposed a corresponding one of battery cells, and is provided with a limiting groove. The limiting groove of each of insulation plates covers an end of the corresponding one of battery cells. A wall of the limiting groove of each of insulation plates is configured to position the corresponding one of battery cells, and a part of the first electrode and a part of the second electrode of each of battery cells are exposed from the insulation plate corresponding to the battery cell.

20 Claims, 2 Drawing Sheets

(51) Int. Cl.
     *H01M 50/505*     (2021.01)
     *H01M 50/507*     (2021.01)
     *H01M 50/593*      (2021.01)

(52) U.S. Cl.
     CPC ........ *H01M 50/507* (2021.01); *H01M 50/593*
                    (2021.01); *Y02E 60/10* (2013.01)

(56)                 References Cited

U.S. PATENT DOCUMENTS

| | | | |
|---|---|---|---|
| 2015/0295280 A1* | 10/2015 | Cho ................. | H01M 10/4207 |
| | | | 429/158 |
| 2017/0365838 A1* | 12/2017 | Okada ................ | H01M 50/503 |
| 2020/0227699 A1 | 7/2020 | Muratsu | |
| 2024/0297392 A1* | 9/2024 | Lee .................... | H01M 50/262 |

FOREIGN PATENT DOCUMENTS

| | | | |
|---|---|---|---|
| CN | 112335117 | A | 2/2021 |
| CN | 213340561 | U | 6/2021 |
| CN | 214706169 | U | 11/2021 |
| CN | 214754065 | U | 11/2021 |
| CN | 217158501 | U | 8/2022 |
| CN | 217158579 | U | 8/2022 |
| JP | 2001325931 | A | 11/2001 |

OTHER PUBLICATIONS

International Search Report in International application No. PCT/CN2022/125953, mailed on Jan. 18, 2023.
Written Opinion of the International Search Authority in International application No. PCT/CN2022/125953, mailed on Jan. 18, 2023.

* cited by examiner

INSULATION BRACKET AND BATTERY MODULE

CROSS-REFERENCE TO RELATED APPLICATIONS

This application is a national stage of International Application No. PCT/CN2022/125953, filed on Oct. 18, 2022, which claims priority to Chinese Patent Application No. 202220278057.8, filed on Feb. 11, 2022. The aforementioned application is hereby incorporated by reference in its entirety.

TECHNICAL FIELD

The present disclosure relates to the field of power battery technology, for example, relates to an insulation bracket and a battery module.

BACKGROUND

A battery module includes a plurality of battery cells, the battery cells are connected in series and parallel via a busbar. In the battery module, when a positive electrode and a negative electrode of the battery cell are disposed at a same side and the battery cell is subjected to an external force such as vibration on a casing, a short circuit occurs easily between adjacent battery cells due to a contact therebetween, which causes a bad security. In related technologies, an insulation structure is generally provided to insulate the battery cells from each other. However, a cost on production is increased due to a difficult manufacture on the insulation structure.

SUMMARY

To solve the above problems, an insulation bracket and a battery module are provided, preventing a contact between battery cells, thereby preventing a short circuit between the battery cells, improving security, and sampling structure.

In a first aspect, an insulation bracket is provided in an embodiment of the present disclosure. The insulation bracket is disposed on a battery cell group, the battery cell group includes a plurality of battery cells, and a first electrode and a second electrode of each of the battery cells are disposed on a same side of the battery cell, wherein the insulation bracket includes a plurality of insulation plates connected to each other, each of the insulation plates is disposed on a corresponding one of the battery cells, and each of the insulation plates is provided with a limiting groove, wherein the limiting groove of each of the insulation plates covers an end of the corresponding one of the battery cells, and a wall of the limiting groove of each of the insulation plates is configured to position the corresponding one of the battery cells, wherein a part of the first electrode and a part of the second electrode of each of the battery cells are exposed from the insulation plate corresponding to the battery cell.

In an embodiment, a bottom of the limiting groove of each of the insulation plates covers another part of the second electrode of the battery cell corresponding to the insulation plate, the bottom is provided with a first isolation portion, the first isolation portion is provided with a through hole, and the first electrode of the battery cell corresponding to the insulation plate is exposed from the insulation plate through the through hole.

In an embodiment, a side of each of the insulation plates away from the corresponding one of the battery cells is provided with a busbar, and each of the insulation plates separates the busbar and the corresponding one of the battery cells.

In an embodiment, a side of each of the insulation plates away from a notch of the limiting groove is provided with a positioning structure, and the positioning structure is configured to position the busbar.

In an embodiment, the positioning structure includes an outward positioning column, the busbar is provided with a mounting hole, and the mounting hole is sleeved on the positioning column; or the positioning structure includes a concave positioning hole, the busbar is provided with a mounting column, and the concave positioning hole is sleeved on the mounting column.

In an embodiment, the plurality of battery cells are cylindrical battery cells.

In an embodiment, an inner diameter of the limiting groove of each of the insulation plates is greater than an external diameter of the corresponding one of the battery cells.

In an embodiment, a difference between the inner diameter of the limiting groove of each of the insulation plates and the external diameter of the corresponding one of the battery cells ranges 0.2 mm-2 mm.

In an embodiment, each of the insulation plates is provided with a second isolation portion, the second isolation portion is configured to separate adjacent ones of the battery cells.

In an embodiment, the plurality of insulation plates are arranged along a first direction, and the second isolation portion includes at least one of:

a first protruding rib, wherein the first protruding rib connects adjacent ones of the insulation plates;

a second protruding rib, wherein the second protruding rib is connected to a side of a peripheral wall of the limiting groove along a second direction; and a third protruding rib, wherein the third protruding rib is connected to a side of a peripheral wall of the limiting groove along the first direction.

In an embodiment, when the second isolation portion includes the second protruding rib, the second protruding rib is provided with a first positioning groove, and the first positioning groove is defined on a side of protruding rib facing away from the limiting groove;

when the second isolation portion includes the third protruding rib, the third protruding rib is provided with a second positioning groove, and the second positioning groove is defined on a side of the third protruding rib facing away from the limiting groove; and when the second isolation portion includes the second protruding rib and the third protruding rib, the second protruding rib is provided with a first positioning groove, the third protruding rib is provided with a second positioning groove, the first positioning groove is defined on a side of the second protruding rib away from the limiting groove, and the second positioning groove is defined on a side of the third protruding rib away from the limiting groove.

In an embodiment, when the second isolation portion includes the second protruding rib and the third protruding rib, the first positioning groove and the second positioning groove are adjacent to position a same one of the battery cells.

In an embodiment, when the second isolation portion includes the second protruding rib, a height difference is defined between a bottom of the limiting groove of each of the insulation plates and the second protruding rib of the each of the insulation plates.

In an embodiment, the plurality of insulation plates are integrally formed.

In an embodiment, the plurality of insulation plates are plastic plates.

In a second aspect, a battery module is provided in an embodiment of the present disclosure. The battery module includes a battery cell group, a busbar, and the insulation bracket, the insulation bracket is disposed on the battery cell group, and the busbar is disposed on the insulation bracket.

In an embodiment, a plurality of battery cell groups and a plurality of insulation brackets are provided, each of the plurality of insulation brackets and each of the plurality of battery cell groups are disposed in a one-to-one correspondence, and each of the insulation brackets is disposed on a corresponding one of the battery cell groups.

Beneficial effects of the embodiments of the present disclosure are as followings:

An insulation bracket and a battery module are provided in the present disclosure. A limiting groove is provided to position a battery cell, which can maintain relative positions between the battery cells in a battery cell group, thereby preventing a short circuit from causing by a contact between adjacent battery cells in the battery cell group due to subjecting to external forces, and improving security. The insulation bracket is provided in the battery module, thereby improving safety and reliability of the battery module. No other insulation design is required, and a structure of the battery module is simplified, and then a cost on production is reduced. An exposed first electrode and an exposed second electrode are connected to a busbar, so that a plurality of battery cells in the battery cell group are connected to each other.

Figure 1:
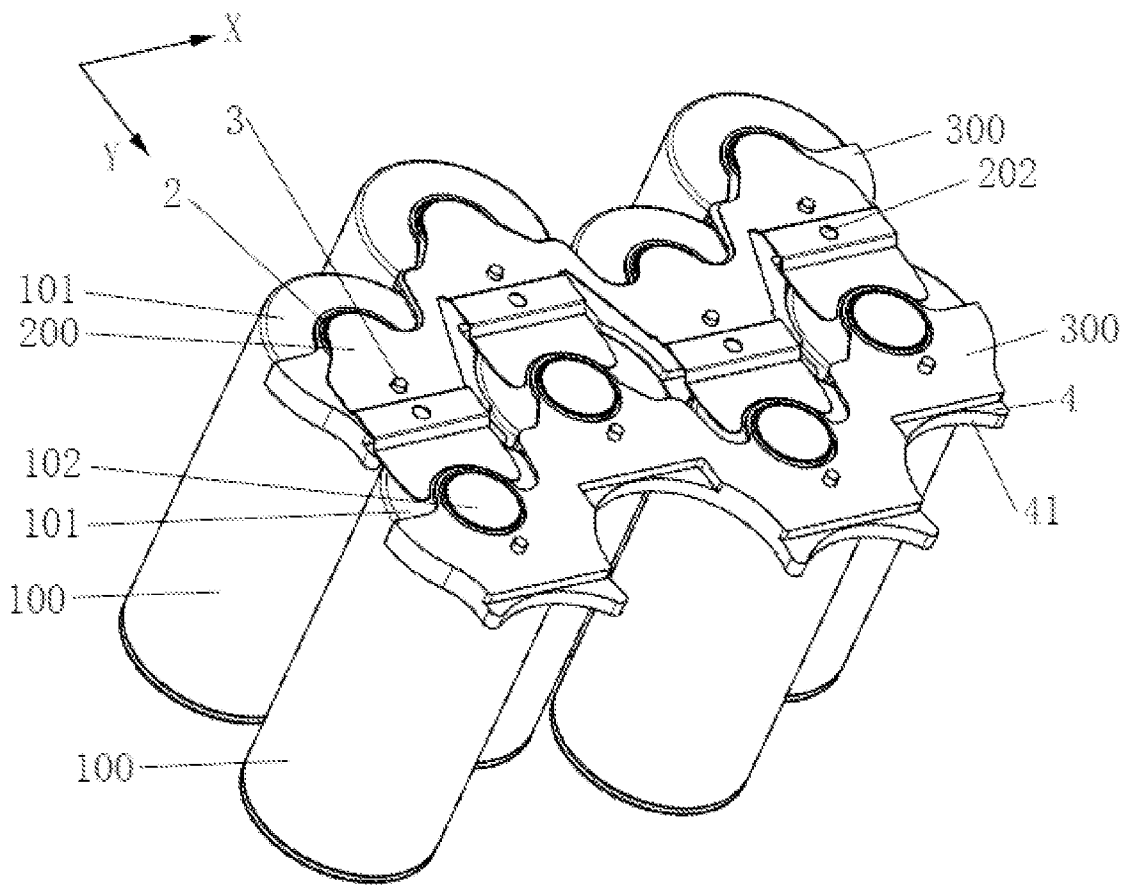
FIG. 1 is a schematic structural diagram of an assembly of an insulation bracket, a battery cell, and a busbar according to an embodiment of the present disclosure.

REFERENCE NUMERALS 100, battery cell; 101, second electrode; 102, first electrode; 200, busbar; 201, mounting hole; 202, processing hole; 203, first electrode connector; 204, intermediate connector; 205, second electrode connector; 300, insulation bracket; 301, insulation plate;
1, limiting groove; 11, wall of limiting groove; 12, bottom of limiting groove; 2, first isolation portion; 21, through hole; 3, positioning column; 4, second isolation portion; 41, positioning groove; 42, first protruding rib; 43, second protruding rib; 44, third protruding rib; 45, second positioning groove; 46, weight reduction groove.

DETAILED DESCRIPTION OF THE EMBODIMENTS

In the description of the present application, unless otherwise specified and limited, the term "connected to each other", "connected" or "fixed" is to be construed in a broad sense, for example, as fixedly connected, detachably connected, or integrated; mechanically connected or electrically connected; directly connected to each other or indirectly connected to each other via an intermediary; or internally connected between two elements or interactional between two elements. Meanings of the preceding terms in the present application may be understood according to situations.

In the present application, unless otherwise specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Figure 2:
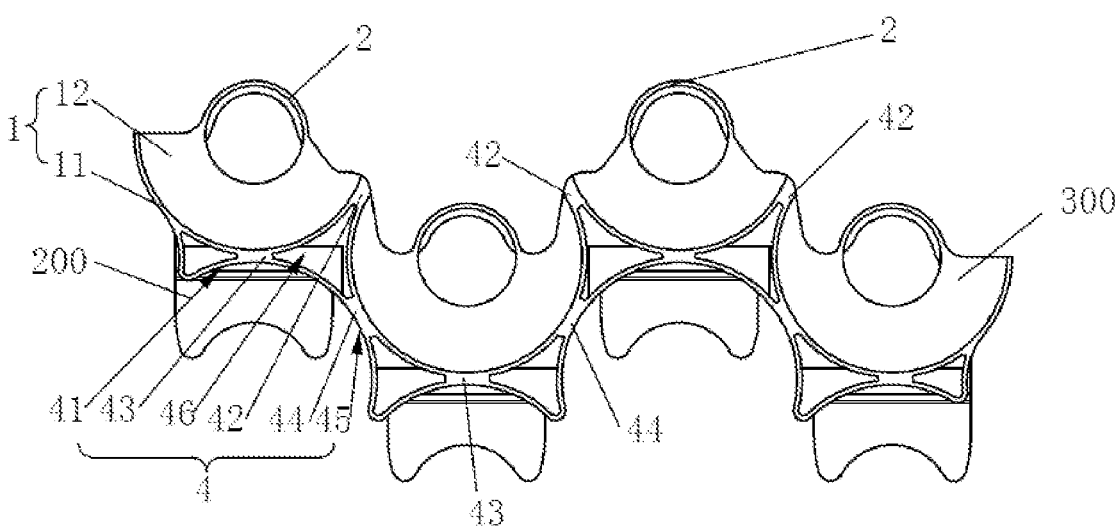
FIG. 2 is a schematic structural diagram of an assembly of an insulation bracket and a busbar according to another embodiment of the present disclosure in a viewing.
Figure 3:
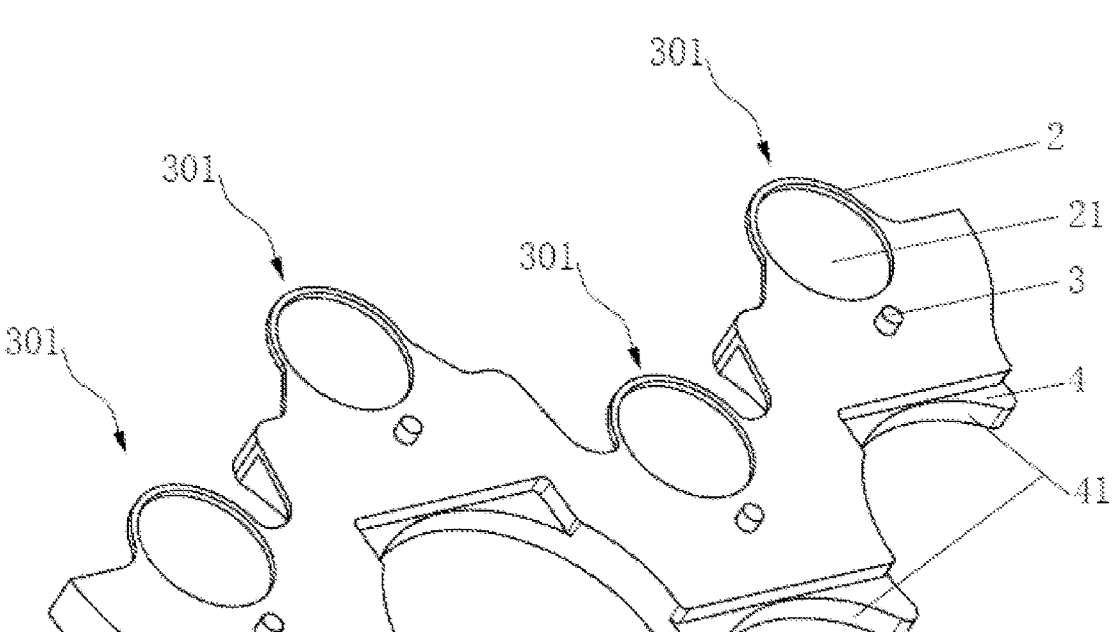
FIG. 3 is a schematic structural diagram of an insulation bracket according to an embodiment of the present disclosure.

A battery module is provided according to an embodiment of the present disclosure. As shown in FIG. 1, the battery module includes a battery cell group and an insulation bracket 300, wherein the insulation bracket 300 is disposed on the battery cell group. The battery cell group includes a plurality of battery cells 100, and a first electrode 102 and a second electrode 101 of each of the battery cells are disposed on a same side of the battery cell. An insulation bracket 300 is further provided an embodiment of the present disclosure. As shown in FIG. 1 to FIG. 3, the insulation bracket 300 includes a plurality of insulation plates 301 connected to each other, each of the insulation plates 301 is disposed on a corresponding one of the battery cells 100 disposed in the battery cell group, and the insulation plate 301 is provided with a limiting groove 1. The limiting groove 1 is disposed on an end of the battery cell 100, a wall 11 of the limiting groove 1 is configured to position the battery cell 100, and a part of the first electrode 102 and a part of the second electrode 101 are exposed from the insulation plate 301.

The limiting groove 1 is configured to position the battery cell 100, which can provide relative positions between the battery cells 100 in the battery cell group. A short circuit is prevented from causing by a contact between adjacent battery cells 100 in the battery cell group due to subjecting an external force, thereby improving security. The above insulation bracket 300 is provided in the battery module, thereby improving safety and reliability of the battery module. No more design for insulation is required, thereby simplifying a structure of the battery module, and then reducing production cost. The first electrode 102 and the second electrode 101 exposed from the insulation plate 301 are connected to a busbar 200, so that the plurality of battery cells 100 in the battery cell group are connected to each other.

Figure 4:
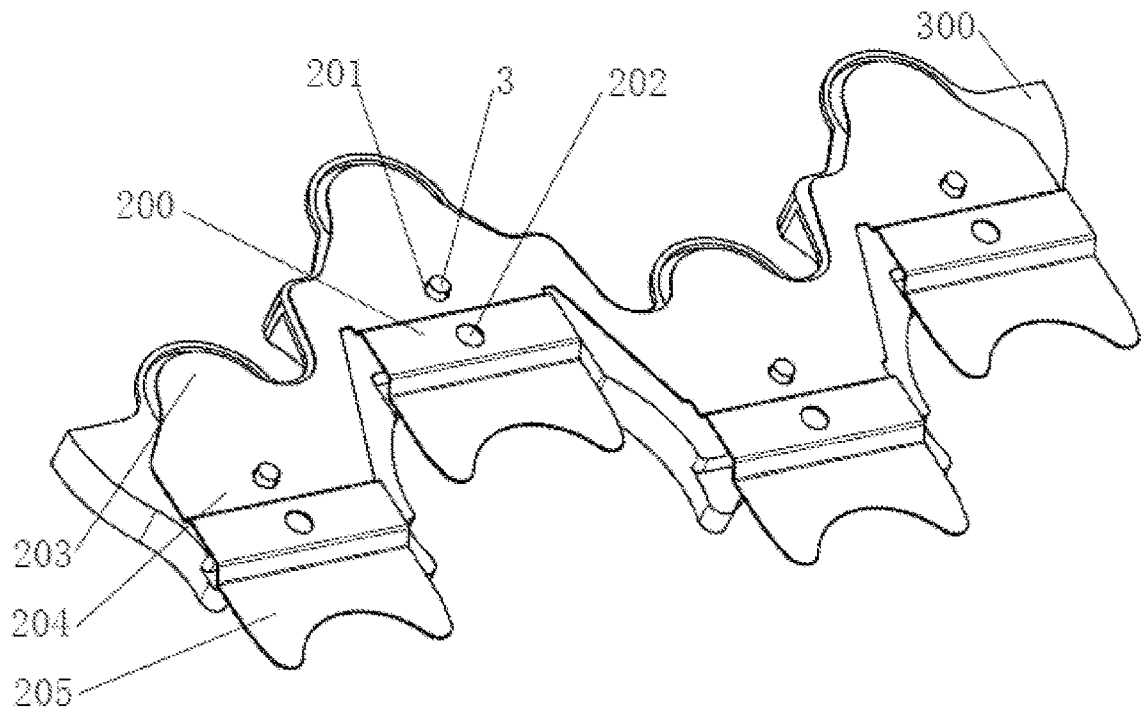
FIG. 4 is a schematic structural diagram of an assembly of an insulation bracket and a busbar according to an embodiment of the present disclosure in another viewing.

As shown in FIG. 4, the busbar 200 includes a plurality of connectors connected to each other, and two adjacent battery cells 100 are connected in series by the connector along a second direction. Each of the connectors includes a first electrode connector 203, a second electrode connector 205, and an intermediate connector 204. The first electrode connector 203 is connected to the first electrode 102 of the battery cell 100. The second electrode connector 205 is connected to the second electrode 101 of another battery cell 100 adjacent to the battery cell 100 to which the first electrode connector 203 is connected. The first electrode connector 203 is connected to the second electrode connector 205 by the intermediate connector 204. In an exemplary embodiment, as shown in FIG. 1 and FIG. 4, the first electrode connector 203 of the connector is connected to the first electrode 102 of one of the two adjacent battery cells 100 exposed from the insulation plate 301. The second electrode connector 205 of the connector is connected to the second electrode 101 of another of the two adjacent battery cells 100 exposed from the insulation plate 301.

Optionally, as shown in FIG. 1, FIG. 2, and FIG. 4, a side of the insulation plate 301 away from the battery cell 100 is provided with the busbar 200, two battery cell groups are connected via the busbar 200, and the busbar 200 is separated from the battery cell 100 by the insulation plate 301, thereby avoiding a short circuit caused by the busbar 200 simultaneously contacting the first electrode 102 and the second electrode 101 of a same battery cell 100, and realizing an insulation isolation between the busbar 200 and the battery cell 100.

One of the first electrode 102 and the second electrode 101 is a positive electrode, and the other is a negative electrode. In the embodiment, taking that the first electrode 102 is positive electrode and the second electrode 101 is negative electrode as an example for illustration.

A plurality of battery cell groups are provided in the battery module, and a plurality of insulation brackets 300 are provided accordingly. Each of the plurality of insulation brackets 300 and each of the plurality of battery cell groups are provided in a one-to-one correspondence. Each of the insulation brackets 300 is disposed on a corresponding one of the battery cell groups, and the number of the insulation brackets 300 is determined by the number of the battery cell groups. The plurality of insulation brackets 300 may be spliced to adapt for the number of the battery cell groups in the battery module, providing a more flexible and more applicable application. When a large number of battery cells 100 in the battery module is provided, the battery cells 100 are divided into a plurality of battery cell groups, reducing the number of the insulation plates 301 in the insulation bracket 300, and thus reducing a requirement on machining accuracy. Generally, the number of the insulation plates 301 in the insulation bracket 300 ranges from 2 to 15. For the battery module with a fixed number of the battery cells 100, it is easier to assembly with more insulation plates 301 and less insulation brackets 300, and it is more applicable and has a lower machining accuracy requirement with less insulation plates 301 and more insulation brackets 300. The number of the insulation plates 301 of the insulation bracket 300 is determined according to the number of the battery cells 100 in the battery cell group.

In an embodiment, as shown in FIG. 1, the battery module is provided with two battery cell groups and two insulation brackets 300. Each of the battery cell groups is provided with four battery cells 100. Each of the insulation brackets 300 includes four insulation plates 301 connected to each other. Each of the insulation plates 301 is provided with a connector. The battery cell group is fixed with the insulation bracket 300. In other embodiments, all of the battery cells 100 in the battery module may also be defined into one battery cell group for a customized design, thereby reducing the number of the insulation brackets 300, and facilitating assembly.

In an embodiment, as shown in FIG. 1, a first direction is an X direction, a second direction is a Y direction, and the first direction is perpendicular to the second direction.

In an embodiment, the battery cell 100 is a cylindrical battery cell, and the wall 11 of the limiting groove 1 is cylindrical. Optionally, the battery cell 100 is a square battery cell, and the limiting groove 1 is designed accordingly. The cylindrical battery cell may have a large diameter. Since a volume of a battery casing is fixed, the larger a diameter of the cylindrical battery cell is, the less of the number of the cylindrical battery cells is. As such, the number of the insulation plates 301 configured to position the cylindrical battery cell is less, and the number of the insulation plates 301 of each of the insulation brackets 300 configured to position the cylindrical battery cell is reduced. Therefore, it reduces a machining accuracy requirement on the insulation bracket 300.

As shown in FIG. 1, the first electrode 102 and the second electrode 101 are disposed at a top of the battery cell 100, a bottom 12 of the limiting groove 1 may be provided with a notch, so that a part of the first electrode 102 and a part of the second electrode 101 are exposed therefrom. Optionally, the limiting groove 1 is provided with a part of the bottom 12 and a part of the wall 11. The part of the wall 11 is disposed around a part of an outer periphery of the battery cell 100, and the part of the bottom 12 covers on a part of a top of the battery cell 100, so that the part of the first electrode 102 and the part of the second electrode 101 are exposed therefrom.

In an embodiment, as shown in FIG. 2, the bottom 12 of the limiting groove 1 covers a part of the second electrode 101, another part of the second electrode 101 is exposed therefrom. A first isolation portion 2 is disposed on the bottom 12, and the first isolation portion 2 is provided with a through hole 21. The first electrode 102 is exposed from the insulation plate 301 through the through hole 21, the first isolation portion 2 is configured to insulate and separate the first electrode 102 and the second electrode 101, thereby preventing a short circuit due to a contact between the first electrode 102 and the second electrode 101. In the embodiment, the first electrode connector 203 of one of the connectors is connected to the first electrode 102 of the battery cell 100 (hereinafter referred to as a first battery cell No. 1 for convenience of description) passing through the through hole 21. The intermediate connector 204 of the connector not connected to the second electrode 101 of the battery cell 100 (hereinafter referred to as a second battery cell No. 2 for convenience of description) adjacent to the first battery cell No. 1 is disposed on the insulation plate 301 corresponding to the first battery cell No. 1. As such, the intermediate connector 204 is separated from the second electrode 101 of the first battery cell No. 1 via the insulation plate 301, so that the connector is separated from the second electrode 101 of the first battery cell No. 1. When the second electrode connector 205 of the connector is connected to the second electrode 101 of the second battery cell No. 2, a side wall of the first electrode 102 of the second battery cell No. 2 close to the second electrode 101 is covered by a wall of the through hole 21, thereby avoiding the second electrode connector 205 of the connector from connecting to the first electrode 102 of the second battery cell No. 2. Thus, the connector is not connected with both the first electrode 102 and the second electrode 101 of the second battery cell No. 2. A shape of the first isolation portion 2 is determined according to structures of the first electrode 102 and the second electrode 101, for example, when the first electrode 102 is disposed around the second electrode 101 and the second electrode 101 protrudes from the first electrode 102, the first isolation portion 2 may be shaped as a circular ring and sleeved on the second electrode 101.

In other embodiments, when a groove is disposed between the first electrode 102 and the second electrode 101, the first isolation portion 2 also may be shaped as a circular ring protruded along a direction from the bottom 12 to a notch of the limiting groove 1 and sleeved on an outer periphery of the first electrode 102. A specific structure of the first isolation portion 2 may be determined according to structures of the first electrode 102 and the second electrode 101.

A side of the insulation plate 301 away from the notch of the limiting groove 1 is provided with a positioning structure. The positioning structure is configured to position the busbar 200, for example, the busbar 200 is fixed through fixing each of the connectors on the busbar 200, so that the busbar 200 is accurately positioned on the insulation plate 301. A relative position between the busbar 200 and the battery cell 100 is accurately ensured, and meanwhile a feasibility on assembly is ensured, which is conducive to improving assembly efficiency of the busbar 200.

In this embodiment, as shown in FIG. 1, the positioning structure includes an outward positioning column 3, the busbar 200 is provided with a mounting hole 201, and the mounting hole 201 is sleeved on the positioning column 3 for easy installation. The connector is disposed on the insulation plate 301, each of the insulation plates 301 is provided with a positioning column 3, each of the connectors is provided with a mounting hole 201, and the mounting hole 201 is mounted the positioning column 3. The positioning column 3 is cylindrical. An external diameter of the positioning column 3 is not less than 3 mm, thereby improving a structural strength of the positioning column 3, and improving a connection reliability. A specific size of the positioning column 3 may be determined according to the busbar 200. In other embodiments, the positioning structure may be a positioning slot, and the busbar 200 is clamped in the positioning slot. For example, the positioning slot is a blind hole; alternatively, the positioning structure is a square convex plate, the busbar 200 is provided with a square hole, and the square hole is sleeved on the square convex plate for positioning. In other embodiments, the positioning structure includes a positioning hole concaved in the insulation plate 301, the busbar 200 (connector in this embodiment) is provided with a mounting column, and the positioning hole is sleeved on the mounting column.

The positioning column 3 is riveted to the mounting hole 201, thereby realizing a fixed connection between the busbar 200 and the insulation plate 301, and avoiding a short circuit caused by a contact between the busbar 200 and adjacent busbar 200 or adjacent battery cell 100 due to unstable connection.

Generally, the battery module is assembled through an automated equipment to improve production efficiency. The busbar 200 is provided with a processing hole 202. When a manipulator takes the busbar 200, the processing hole 202 may be used as a positioning benchmark for taking the busbar 200, thereby improving assembly accuracy between the busbar 200 and the insulation bracket 300.

Optionally, when the battery cell 100 is a cylindrical cell, the limiting groove 1 is a circular groove or arc groove. An inner diameter of the limiting groove 1 is greater than an external diameter of the battery cell 100, which can accommodate a dimensional tolerance of the battery cell 100 and an accumulated dimensional tolerance of a plurality of the battery cells 100, thereby maintaining relative positions between the battery cells 100, providing early guarantee for an accurate positioning of the busbar 200, and ensuring feasibility of assembly. Optionally, a difference between the inner diameter of the limiting groove 1 and the external diameter of the battery cell 100 ranges from 0.2 mm to 2 mm, for example, the difference is 1 mm.

Optionally, the insulation plate 301 is provided with a second isolation portion 4, the second isolation portion 4 is configured to separate adjacent two battery cells 100, thereby ensuring a safe distance between the battery cells 100. The second isolation portion 4 may separate the battery cells 100 in a same battery cell group, and may also separate the battery cells 100 between adjacent battery cell groups, thereby realizing insulation isolation, avoiding unsafe electrical problems, improving safety, meanwhile ensuring safe electrical clearance and creepage distance. In an exemplary embodiment, the second isolation portion 4 is a protruding rib disposed between peripheries of walls 11 of adjacent limiting grooves 1.

As shown in FIG. 1, all of the battery cells in the battery cell group are arranged along the first direction, and the battery cells 100 are misaligned with each other in the second direction. All of the insulation plates 301 on the insulation bracket 300 are arranged along the first direction, and the insulation plates 301 are misaligned with each other in the second direction. A plurality of the insulation plates 301 are arranged according to an arrangement of a plurality of the battery cells 100, so that the plurality of the insulation plates 301 are configured to position the plurality of the battery cells 100 respectively.

Optionally, as shown in FIG. 2, four insulation plates 301 are arranged along the first direction and disposed on a battery cell bar. In order to adapt to positions of a plurality of the battery cells 100 in the battery cell bar, four insulation plates 301 are misaligned along the second direction.

Optionally, the second isolation portion 4 includes a first protruding rib 42 connected adjacent two insulation plates 301, and the first protruding rib 42 is configured to insulate and separate adjacent two battery cells in a same battery cell group along the first direction.

Optionally, the second isolation portion 4 includes a second protruding rib 43, the second protruding rib 43 is connected to a side of a peripheral wall of the limiting groove 1 along a second direction, and the second protruding rib 43 is configured to insulate and separate adjacent two battery cells 100 in adjacent two battery cell groups along the second direction.

Optionally, the second isolation portion 4 includes a third protruding rib 44, the third protruding rib 44 is connected to a side of a peripheral wall of the limiting groove 1 along the first direction, and the third protruding rib 44 is configured to insulate and separate adjacent two battery cells 100 in adjacent two battery cell groups along the first direction.

Optionally, when the second isolation portion 4 includes the second protruding rib 43, the second protruding rib 43 is provided with a first positioning groove 41, and the first positioning groove 41 is disposed on a side of the second protruding rib 43 away from the limiting groove 1. The first positioning groove 41 is configured to position the battery cells 100 of adjacent battery cell groups in the second direction.

The bottom 12 of the limiting groove 1 covers the first electrode 102 of the first battery cell 100. Since the first positioning groove 41 does not have the bottom 12, so that the second electrode 101 of the second battery cell 100 is exposed therefrom, thereby achieving the bottom 12 of the limiting groove 1 to separate the second electrode 101 of the first battery cell 100 and the connector, and to separate the second electrode 101 of the second battery cell 100 and the connector. A height difference is defined between a depth of the bottom 12 of the limiting groove 1 and a height of the second protruding rib 43. The height difference can ensure the limiting groove 1 cover an top of the first battery cell 100, and the first positioning groove 41 of the second protruding rib 43 position a side of the second battery cell 100, thereby separating two battery cells 100 in the second direction.

Optionally, when the second isolation portion 4 includes the third protruding rib 44, the third protruding rib 44 is provided with a second positioning groove 45, and the second positioning groove 45 is defined on a side of the third protruding rib 44 away from the limiting groove 1. The second positioning groove 45 is configured to position the battery cells 100 in adjacent battery cell groups in the first direction.

When the second isolation portion 4 is provided with the first positioning groove 41 and the second positioning groove 45, due to misaligning a plurality of the battery cells 100 in the battery cell group, the first positioning groove 41 and the second positioning groove 45 are adjacent to position a same battery cell.

In an embodiment, the battery cell 100 is a cylindrical battery cell, and the first positioning groove 41 is an arc groove.

When the second isolation portion 4 is provided with the first protruding rib 42, the second protruding rib 43, and the third protruding rib 44, the three are integrally formed. The second isolation portion 4 is also provided with a weight reduction groove 46.

Optionally, the plurality of insulation plates 301 may be integrally formed, and the plurality of insulation plates 301 are connected to each other via the second isolation portion 4. Optionally, the plurality of insulation plates 301 may also be separated.

Optionally, the insulation plate 301 is a plastic plate. For example, it may be made of Polycarbonate (PC) with Acrylonitrile Butadiene Styrene (ABS) or other insulating materials, which is not limited here.

An insulation bracket and a battery module are provided in the present disclosure. A limiting groove is provided to position a battery cell, which can maintain relative positions between the battery cells in the battery cell group, thereby preventing a short circuit from causing by a contact between adjacent battery cells in the battery cell group due to subjecting to external forces, and improving security. The insulation bracket is provided in the battery module, thereby improving safety and reliability of the battery module. No other insulation design is required, and a structure of the battery module is simplified, and then a cost on production is reduced. An exposed first electrode and an exposed second electrode are connected to a busbar, so that a plurality of battery cells in the battery cell group are connected to each other.

What is claimed is:

1. An insulation bracket, wherein the insulation bracket is disposed on a battery cell group, the battery cell group comprises a plurality of battery cells, and a first electrode and a second electrode of each of the battery cells are disposed on a same side of the battery cell, wherein the insulation bracket comprises a plurality of insulation plates connected to each other, each of the insulation plates is disposed on a corresponding one of the battery cells, and each of the insulation plates is provided with a limiting groove, wherein the limiting groove of each of the insulation plates covers an end of the corresponding one of the battery cells, and a wall of the limiting groove of each of the insulation plates is configured to position the corresponding one of the battery cells, wherein a part of the first electrode and a part of the second electrode of each of the battery cells are exposed from the insulation plate corresponding to the battery cell;

wherein a bottom of the limiting groove of each of the insulation plates covers another part of the second electrode of the battery cell corresponding to the insulation plate, the bottom is provided with a first isolation portion, the first isolation portion is provided with a through hole, and the first electrode of the battery cell corresponding to the insulation plate is exposed from the insulation plate through the through hole;

wherein each of the insulation plates is provided with a second isolation portion, the second isolation portion is configured to separate adjacent ones of the battery cells;

wherein the plurality of insulation plates are arranged along a first direction, and the second isolation portion comprises at least one of:

a first protruding rib, wherein the first protruding rib connects adjacent ones of the insulation plates;

a second protruding rib, wherein the second protruding rib is connected to a side of a peripheral wall of the limiting groove along a second direction; and a third protruding rib, wherein the third protruding rib is connected to a side of a peripheral wall of the limiting groove along the first direction.

2. The insulation bracket of claim 1, wherein a side of each of the insulation plates away from the corresponding one of the battery cells is provided with a busbar, and each of the insulation plates separates the busbar and the corresponding one of the battery cells.

3. The insulation bracket of claim 2, wherein a side of each of the insulation plates away from a notch of the limiting groove is provided with a positioning structure, and the positioning structure is configured to position the busbar.

4. The insulation bracket of claim 3, wherein the positioning structure comprises an outward positioning column, the busbar is provided with a mounting hole, and the mounting hole is sleeved on the positioning column; or the positioning structure comprises a concave positioning hole, the busbar is provided with a mounting column, and the concave positioning hole is sleeved on the mounting column.

5. The insulation bracket of claim 1, wherein the plurality of battery cells are cylindrical battery cells.

6. The insulation bracket of claim 5, wherein an inner diameter of the limiting groove of each of the insulation plates is greater than an external diameter of the corresponding one of the battery cells.

7. The insulation bracket of claim 6, wherein a difference between the inner diameter of the limiting groove of each of the insulation plates and the external diameter of the corresponding one of the battery cells ranges from 0.2 mm to 2 mm.

8. The insulation bracket of claim 1, wherein when the second isolation portion comprises the second protruding rib, the second protruding rib is provided with a first positioning groove, and the first positioning groove is defined on a side of the second protruding rib away from the limiting groove;

when the second isolation portion comprises the third protruding rib, the third protruding rib is provided with a second positioning groove, and the second positioning groove is defined on a side of the third protruding rib away from the limiting groove; and when the second isolation portion comprises the second protruding rib and the third protruding rib, the second protruding rib is provided with a first positioning groove, the third protruding rib is provided with a second positioning groove, the first positioning groove is defined on a side of the second protruding rib away from the limiting groove, and the second positioning groove is defined on a side of the third protruding rib away from the limiting groove.

9. The insulation bracket of claim 8, wherein when the second isolation portion comprises the second protruding rib and the third protruding rib, the first positioning groove and the second positioning groove are adjacent to position a same one of the battery cells.

10. The insulation bracket of claim 8, wherein when the second isolation portion comprises the second protruding rib, a height difference is defined between a bottom of the limiting groove of each of the insulation plates of each of the insulation plates and the second protruding rib of the each of the insulation plates.

11. The insulation bracket of claim 1, wherein the plurality of insulation plates are integrally formed.

12. The insulation bracket of claim 1, wherein the plurality of insulation plates are plastic plates.

13. A battery module, comprising:

a battery cell group;

a busbar; and an insulation bracket, wherein the insulation bracket is disposed on the battery cell group, and the busbar is disposed on the insulation bracket;

the battery cell group comprises a plurality of battery cells, and a first electrode and a second electrode of each of the battery cells are disposed on a same side of the battery cell, wherein the insulation bracket comprises a plurality of insulation plates connected to each other, each of the insulation plates is disposed on a corresponding one of the battery cells, and each of the insulation plates is provided with a limiting groove, wherein the limiting groove of each of the insulation plates covers an end of the corresponding one of the battery cells, and a wall of the limiting groove of each of the insulation plates is configured to position the corresponding one of the battery cells, wherein a part of the first electrode and a part of the second electrode of each of the battery cells are exposed from the insulation plate corresponding to the battery cell;

wherein a bottom of the limiting groove of each of the insulation plates covers another part of the second electrode of the battery cell corresponding to the insulation plate, the bottom is provided with a first isolation portion, the first isolation portion is provided with a through hole, and the first electrode of the battery cell corresponding to the insulation plate is exposed from the insulation plate through the through hole;

wherein each of the insulation plates is provided with a second isolation portion, the second isolation portion is configured to separate adjacent ones of the battery cells;

wherein the plurality of insulation plates are arranged along a first direction, and the second isolation portion comprises at least one of:

a first protruding rib, wherein the first protruding rib connects adjacent ones of the insulation plates;

a second protruding rib, wherein the second protruding rib is connected to a side of a peripheral wall of the limiting groove along a second direction; and a third protruding rib, wherein the third protruding rib is connected to a side of a peripheral wall of the limiting groove along the first direction.

14. The battery module of claim 13, wherein a plurality of battery cell groups and a plurality of insulation brackets are provided, each of the plurality of insulation brackets and each of the plurality of battery cell groups are disposed in a one-to-one correspondence, and each of the insulation brackets is disposed on a corresponding one of the battery cell groups.

15. The battery module of claim 13, wherein a side of each of the insulation plates away from the corresponding one of the battery cells is provided with the busbar, and each of the insulation plates separates the busbar and the corresponding one of the battery cells.

16. The battery module of claim 15, wherein a side of each of the insulation plates away from a notch of the limiting groove is provided with a positioning structure, and the positioning structure is configured to position the busbar.

17. The battery module of claim 16, wherein the positioning structure comprises an outward positioning column, the busbar is provided with a mounting hole, and the mounting hole is sleeved on the positioning column; or the positioning structure comprises a concave positioning hole, the busbar is provided with a mounting column, and the concave positioning hole is sleeved on the mounting column.

18. The battery module of claim 13, wherein the plurality of battery cells are cylindrical battery cells.

19. The insulation bracket of claim 1, wherein the bottom surrounds a portion of the through hole in an circumferential direction of the through hole.

20. The battery module of claim 13, wherein the bottom surrounds a portion of the through hole in an circumferential direction of the through hole.

* * * * *